Oct. 13, 1964     E. H. LAND ETAL     3,152,531
PHOTOGRAPHIC DOCUMENT COPYING APPARATUS
Filed Aug. 23, 1961     8 Sheets-Sheet 1

Edwin H. Land
Nicholas Gold
and
Arthur J. Sable
INVENTORS

BY Brown and Mikulka
and
Robert E. Corb
ATTORNEYS

Oct. 13, 1964  E. H. LAND ETAL  3,152,531
PHOTOGRAPHIC DOCUMENT COPYING APPARATUS
Filed Aug. 23, 1961  8 Sheets-Sheet 2

Edwin H. Land
Nicholas Gold
and
Arthur J. Sable
INVENTORS

BY Brown and Mikulka
and
Robert E. Corb
ATTORNEYS

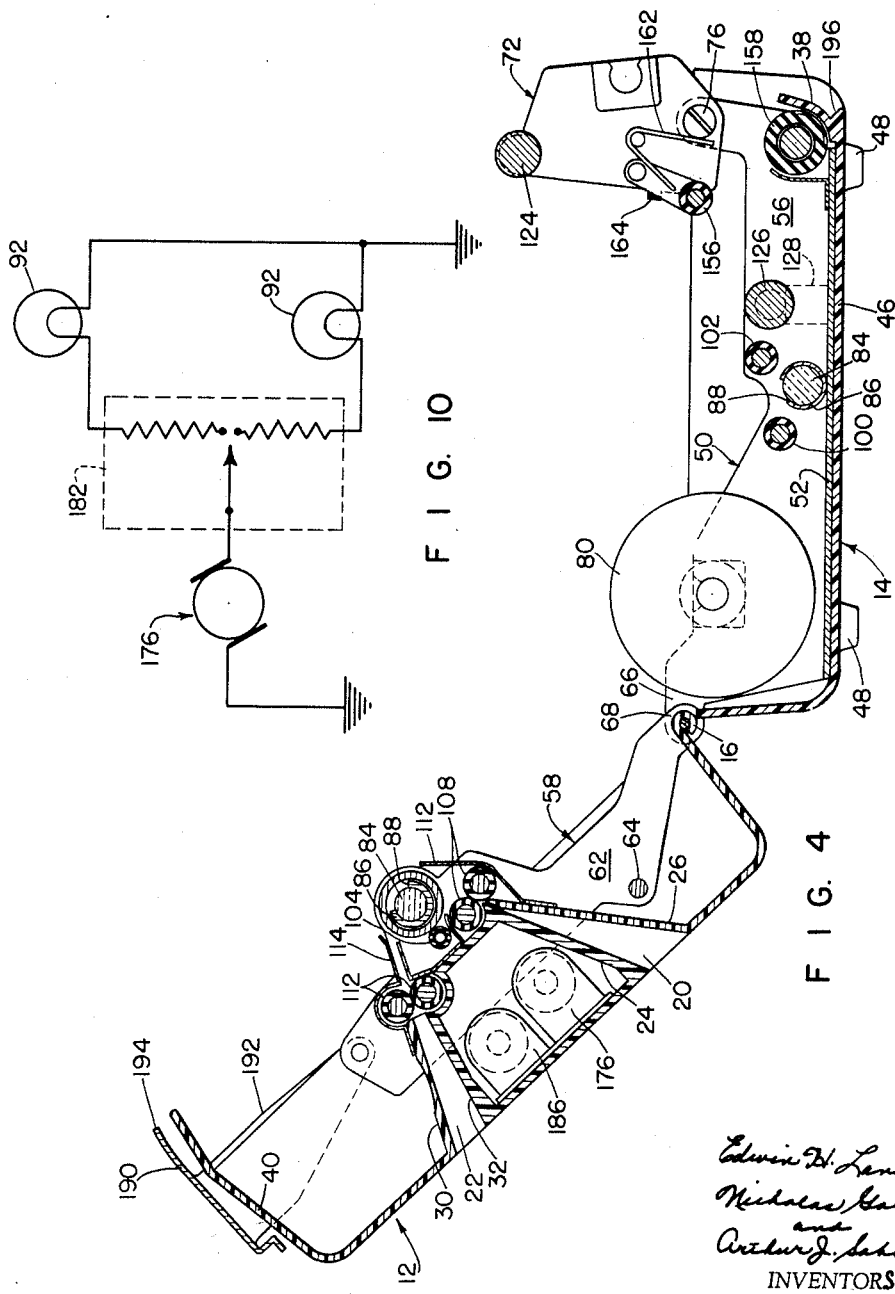

Oct. 13, 1964 E. H. LAND ETAL 3,152,531
PHOTOGRAPHIC DOCUMENT COPYING APPARATUS
Filed Aug. 23, 1961 8 Sheets-Sheet 4
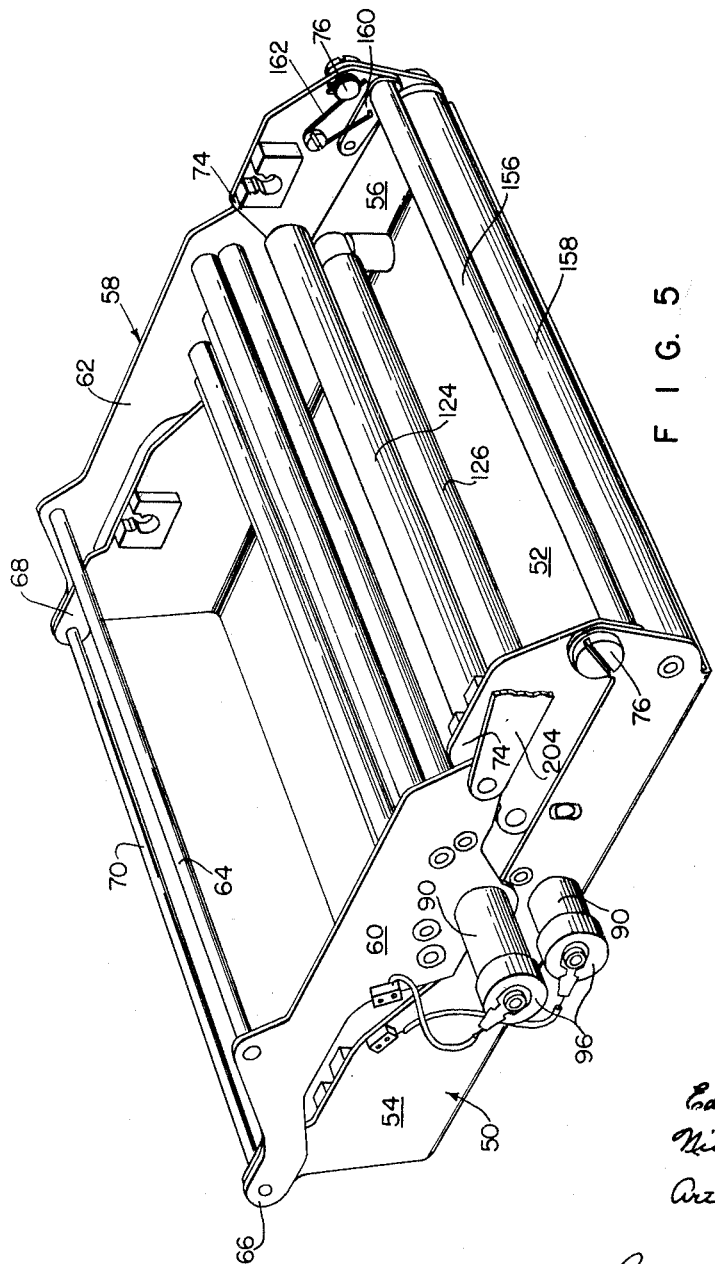

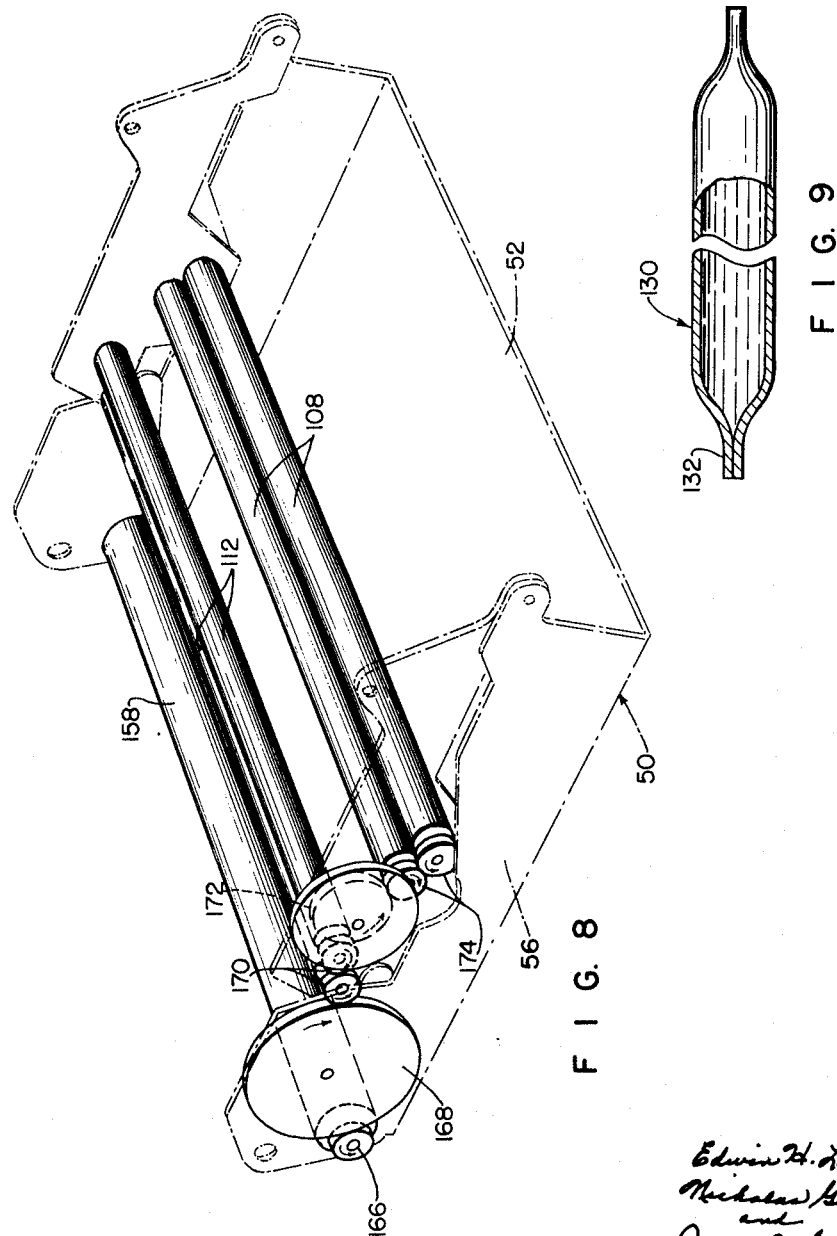

Oct. 13, 1964  E. H. LAND ETAL  3,152,531
PHOTOGRAPHIC DOCUMENT COPYING APPARATUS
Filed Aug. 23, 1961  8 Sheets-Sheet 7

INVENTORS
Edwin H. Land
Nicholas Gold
and
Arthur J. Sahle

BY Brown and Mikulka
and
Robert E. Corb
ATTORNEYS

Oct. 13, 1964

E. H. LAND ETAL 3,152,531

PHOTOGRAPHIC DOCUMENT COPYING APPARATUS

Filed Aug. 23, 1961

Edwin H. Land
Nicholas Gold
and
Arthur J. Sahle
INVENTORS

BY Brown and Mikulka
and
Robert E. Cobb
ATTORNEYS

United States Patent Office 3,152,531
Patented Oct. 13, 1964

3,152,531
PHOTOGRAPHIC DOCUMENT COPYING
APPARATUS
Edwin H. Land, Cambridge, Nicholas Gold, Arlington, and Arthur J. Sable, Boston, Mass., assignors to Polaroid Corporation, Cambridge, Mass., a corporation of Delaware
Filed Aug. 23, 1961, Ser. No. 133,397
16 Claims. (Cl. 95—75)

This invention relates to photographic apparatus, and, more particularly, to photographic apparatus for making copies of original documents.

A complete photographic document copying apparatus generally comprises means for exposing a photosensitive image-recording material in conjunction with an original to produce an image of the original and means for treating the exposed image-recording material to produce a copy of the original. In document copying devices of the type with which the present invention is concerned, the image-recording material is in the form of a sheet comprising a support carrying a layer of a photosensitive material such as silver halide. An area of the photosensitive sheet is exposed in conjunction with the original and is then subjected to a process involving the distribution of a fluid in contact with the photosensitive material. The apparatus of the invention is designed to produce a positive copy by a "dry" process, so-called because the fluid is confined between the photosensitive sheet and a second sheet, superposed with the photosensitive sheet following exposure thereof. Additional features common to most document copying apparatus of this type include means for feeding an original into the apparatus, superposing it with the photosensitive sheet during exposure of the photosensitive sheet, separating the original from the photosensitive sheet and feeding from the apparatus, exposing the photosensitive sheet, superposing the photosensitive sheet with a second sheet, distributing a processing fluid between the sheets to form a sandwich in which the copy is produced, and advancing the sheets through the apparatus.

An object of the invention is to provide document copying apparatus of the type described including an electric lamp for exposing a photosensitive image-recording material, the apparatus being manually operable and not requiring an outside source of electrical current, the latter being supplied as a result of the manual operation of said apparatus.

Another object of the invention is to provide document copying apparatus of the foregoing type including an electrical generator, operated in response to manual advancement of a sheet of photosensitive image-recording material through said apparatus, for supplying current to a lamp for exposing said image-recording material.

A further object of the invention is to provide document copying apparatus as described characterized by a construction which is simple and inexpensive, is compact and makes the apparatus portable, is dependable in its operation, and is uniformly reliable in its results.

Other objects of the invention will in part be obvious and wil in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a view similar to FIG. 3 showing the components of the apparatus in an inoperative position in which the components are spaced apart to permit loading of sheet material into the apparatus;

FIG. 5 is a perspective view of components of the apparatus shown with the outer housing removed;

FIG. 8 is a view similar to FIG. 5 illustrating components of the apparatus;

FIG. 9 is a fragmentary view, partially in section, of a fluid container for introducing processing fluid into the apparatus;

FIG. 10 is an electrical diagram showing the electrical components of the apparatus;

Figure 1:
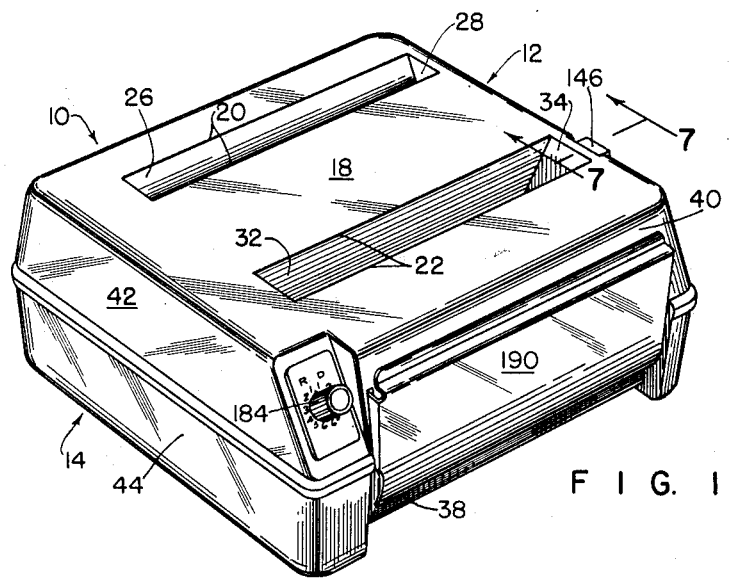
FIGURES 1 and 2 are perspective views of document copying apparatus embodying the invention.
Figure 2:
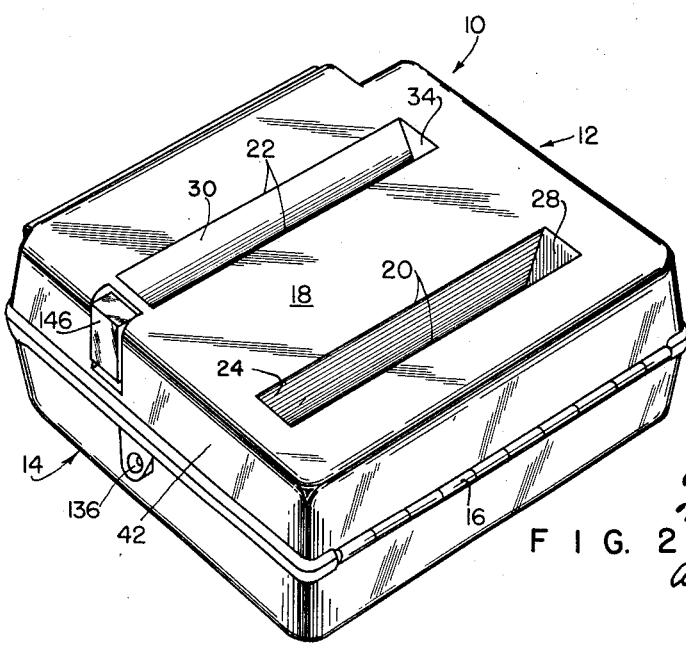

The document copying apparatus of the invention represents a novel departure from the usual practice in that electrical current for a lamp for exposing the photosensitive material is supplied by a generator operated manually in connection with advancement of sheet materials through the apparatus. The document copier requires no outside source of electrical current, nor an internal electrical storage means such as a battery, and the operation of the apparatus, including exposure of the photosensitive material, is entirely manual. The operation of the device is quite simple, requiring only that the person using it introduce a container of processing fluid, and then withdraw the container, introduce an original document to be copied into an opening in the device, and then advance the sheets through the apparatus either by grasping and withdrawing the sheets directly or by manipulating a single operating member.

Reference is now made to FIGS. 1 through 8 wherein there is illustrated one form of photographic document copying apparatus embodying the invention. This apparatus comprises a housing, designated 10, for mounting and enclosing the components of the apparatus. Housing 10 comprises an upper housing section 12 and a lower housing section 14 pivotally secured to one another at a hinge 16 located at one end (termed the rear end) of the housing. The two housing sections are pivotable between the closed or operative position shown in FIGS. 1 through 3, in which the components of the apparatus are in operative relation, and the open or inoperative position shown in FIG. 4, in which the two housing sections are located apart from one another to permit loading of photographic materials into the apparatus in preparation for use.

Upper housing section 12 includes an upper wall 18 including means defining an inlet passage 20 and exit passage 22 through which an original document to be copied can be, respectively, introduced into and fed from the apparatus. Inlet pasage 20 is defined by convergent walls designated, for purposes of description, as a forward wall 24, a rear wall 26 and side walls 28. Exit passage 22 is similarly defined by a forward wall 30, rear wall 32 and side walls 34. The housing sections include portions defining a withdrawal opening 36 at the forward end of the housing through which photographic sheet materials, including copies produced by the apparatus, are withdrawn from the housing. Withdrawal opening 36 is defined by a forward end wall 38 on lower housing section 14 and a forward end wall 40 on upper housing section 12. Forward end wall 38 extends upwardly at an angle toward the front of the housing and forward end wall 40 extends downwardly at an angle toward the front of the housing at an angle toward the rear of the housing where the lower edge of forward end wall 40 cooperates with the upper edge of forward end wall 38 to define withdrawal opening 36.

Housing 10 includes upper side walls 42 on upper housing sections 12 and lower side walls 44 on lower housing section 14. Lower housing section 14 also includes a bottom wall 46 on which are mounted feet 48 which serve to support the apparatus, and which are preferably formed of a material, such as rubber, having a high coefficient of friction for preventing the apparatus from sliding on the surface on which it is supported during use.

The operative components of the document copying apparatus are mounted on support members or chassis carried within housing 10 on the upper and lower housing sections. These support members include a lower chassis or frame 50 comprising a base plate 52 and side plates 54 and 56 extends upwardly from the base plate which rests on bottom wall 46 of lower housing section 14. An upper chassis or frame 58 is provided comprising side plates 60 and 62 which may be joined by connecting rods 64. Side plates 54 and 56 are provided with hinge extensions 66 and side plates 60 and 62 are similarly provided with hinge extensions 68. The hinge extensions of the upper and lower chassis or frames are pivoted at hinge 16 on a common hinge pin 70. Upper chassis 58 is secured within upper housing section 12 so that the upper chassis and housing section pivot together about hinge pin 70.

The apparatus includes an intermediate chassis or frame 72 comprising a pair of arms 74 pivotally mounted adjacent their ends on side plates 54 and 56 adjacent the forward ends of the side plates. Arms 74 are pivotally mounted at studs 76 secured in side plates 54 and 56 so that intermediate chassis 72 may be pivoted between the operative position, shown in FIG. 3, to the inoperative position of FIG. 4 which permits loading of photographic materials into the apparatus.

The document copying apparatus of the invention is designed to produce copies of original documents by a photographic process involving the exposure of a photosensitive sheet and the treatment of the exposed photosensitive sheet with a fluid to produce a transfer image in a second or image-receiving sheet which is superposed with the exposed photosensitive sheet during treatment of the latter. The photosensitive sheet, herein designated 77, preferably comprises a photosensitive silver halide carried on a suitable support. The silver halide may be in the form of a gelatin emulsion and the support may comprise any of the conventional film base materials, paper being preferably because of its inexpensiveness. Exposure of the photosensitive material may be of one of two different types, i.e., "reflex" or "direct." "Direct" exposure of the photosensitive material involves exposure of the silver halide to light transmitted through the original to the photosensitive material, and is useful when the original has subject matter on only one surface and the material comprising the original is transmissive to light actinic to the photosensitive material. When the original has subject matter on both sides or is not transmissive to actinic light, then "reflex" exposure is used and this involves transmitting the acinic light through the photosensitive sheet to the surface (to be copied) of the original which reflects some of the light back to the photosensitive material further exposing the photosensitive material to form a developable image therein.

Following exposure, the photosensitive material is treated with a fluid in conjunction with a second or image-receiving sheet, herein designated 78, superposed with the photosensitive sheet to form a transfer image on the image-receiving sheet. Image formation is effected by a silver halide diffusion transfer-reversal process distinguished by the fact that it is an essentially dry process, in which the fluid effecting the processing is confined between the sheets, obviating the necessity for tanks of fluid in which the sheets are immersed.

In this type of photographic transfer process, the photosensitive and second sheets are superposed and a fluid is distributed between the sheets by advancement of the superposed sheets in superposition between a pair of pressure-applying members. The two sheets are retained in superposition for a predetermined period during which a silver halide developer in the processing fluid reduces exposed silver halide to silver and unexposed silver halide is converted to a soluble complex which is transferred by diffusion to the image-receiving sheet where it is reduced to silver to form a positive transfer image. The image-receiving sheet may include an image-receptive layer carried on a suitable support such as paper, or may act as a support for a layer of fluid in which the image is formed.

For examples of processes of this type and materials useful therein, reference may be had to U.S. Patents Nos. 2,543,181, issued February 27, 1951, and 2,662,822, issued December 15, 1953, both in the name of Edwin H. Land.

The apparatus comprises means for holding a supply of photosensitive sheet 77, preferably in the form of an elongated web or strip of sufficient length to make a large number of copies. This means comprises a conventional spool 80 and means on side plates 54 and 56 of lower chassis 50 for mounting the spool at its ends for pivotal movement between the side plates within the rearmost portion of housing 10. An important advantage of providing a continuous photosensitive sheet, in a light-free environment, for a plurality of copies, resides in the fact that the photosensitive material can be of a "high speed" type since it is not handled in the light. Arms 74 of intermediate chassis 72 are provided with means for mounting a second spool 82 on which is coiled a supply of image-receiving sheet 78 substantially equal in length and width to photosensitive sheet 77. The supply of second sheet 78 on spool 82 is enclosed within housing 10 at the forward end of the housing.

The document copying apparatus of the invention includes means for subjecting the photosensitive material to both reflex and direct types of exposures. The exposure means comprises two sources of illumination and means for conducting the photosensitive sheet and an original in superposition past the sources of illumination to effect exposure of the photosensitive sheet. The use of a "high-speed" photosensitive material obviates the need for the usual high intensity light sources normally required for document copying apparatus, and thereby makes feasible the use of a generator with a relatively small power output. The sources of illumination are elongated and essentially the same. In the form shown, each comprises an elongated bar or rod 84 of a transparent material such as glass or an organic plastic. Bar 84 is substantially circular in cross section, is at least equal in length to the width of the photosensitive sheet material, and is provided with a polished surface throughout, so that the bar functions to conduct light from a source at one end toward its other end. Bars 84 are each enclosed in a cylindrical tube 86 formed of a material such as metal, which is opaque to light actinic to the photosensitive material and is provided with an axial slot 88 at least equal in length to the width of the photosensitive sheet for transmitting light emitted from bar 84. One of the sources of illumination is mounted on upper housing section 12 and the other is mounted on lower housing section 14, and the photosensitive sheet and original are guided in superposition between the two sources of illumination so that the photosensitive sheet may be subjected to either a reflex or direct exposure. One of tubes 86 is mounted at one end in side plate 56 with its other end sections, designated 90, extending through an opening in side plate 54. The other tube 86 is similarly mounted with one end secured in side plate 62 and its other end section 90 extending through an opening in side plate 60.

The sources of illumination are in the form of incandescent lamps 92, each mounted within end section 90 of a tube 86 adjacent the end of the bar 84 contained within the tube. Each lamp 92 is shown mounted in a reflector 94 carried on end cap 96 secured to end section 90 of the tube. Tubes 86 and bars 84 contained therein are mounted with their axes substantially parallel and with slots 88 facing one another. The cylindrical surface of each of bars 84 is provided with a roughened or scratched area extending lengthwise of the bar and covering a longitudinal portion of the cylindrical surface disposed opposite the slot 88 of the tube 86 in which the bar is enclosed. This roughened surface functions as a diffusing reflector for reflecting light transmitted by the bar from lamp 92 radially through the slot in the tube. In order to insure uniformity of light emitted by each bar throughout the length of the slot through which the emitted light is transmitted, the area of the roughened or scratched surface portion varies in its angular dimension from end to end of the bar, this area being smaller at the end closest the lamp and larger at the end furthest from the lamp. The roughened areas of the bars are shown as being made up of a plurality of axial scratches or grooves of varying lengths.

Other forms of light sources may be incorporated in the structure of the invention, including, for example, elongated electroluminescent panels and the like which require relatively little power for their operation.

The guide means of the invention includes a cylindrical tube 98 formed of a material such as glass or organic plastic capable of transmitting light actinic to the photosensitive material. Tube 98 has an inside diameter greater than the outside diameter of tube 86 and is mounted in surrounding relating to the tube 86 which is mounted on upper chassis 58. A pair of elongated guide rolls 100 and 102 are provided mounted for rotation on and intermediat side plate 54 and 56. Guide rolls 100 and 102 are positioned with their axes substantially parallel with one another and with the axes of bars 84 and tubes 86, and are located for engaging tube 98 at positions spaced from one another around the periphery of the cylindrical surface of tube 98. A backing roll 104 is provided mounted for rotation on and intermediate side plates 60 and 62 in position for urging tube 98 against guide rolls 100 and 102.

Photosensitive sheet 77 is conducted from spool 80 between guide roll 100 and tube 98 around a portion of the cylindrical surface of tube 98 and between guide roll 102 and tube 98. Slots 88 in tube 86 are positioned for transmitting light from bars 84 for exposing the portion of the photosensitive sheet supported by tube 98 intermediate guide rolls 100 and 102, and the sources of illumination are designed to be used selectively and one at a time for exposing the photosensitive sheet as it is advanced around the portion of tube 98 between guide rolls 100 and 102 past slots 88 in tubes 86.

Figure 3:
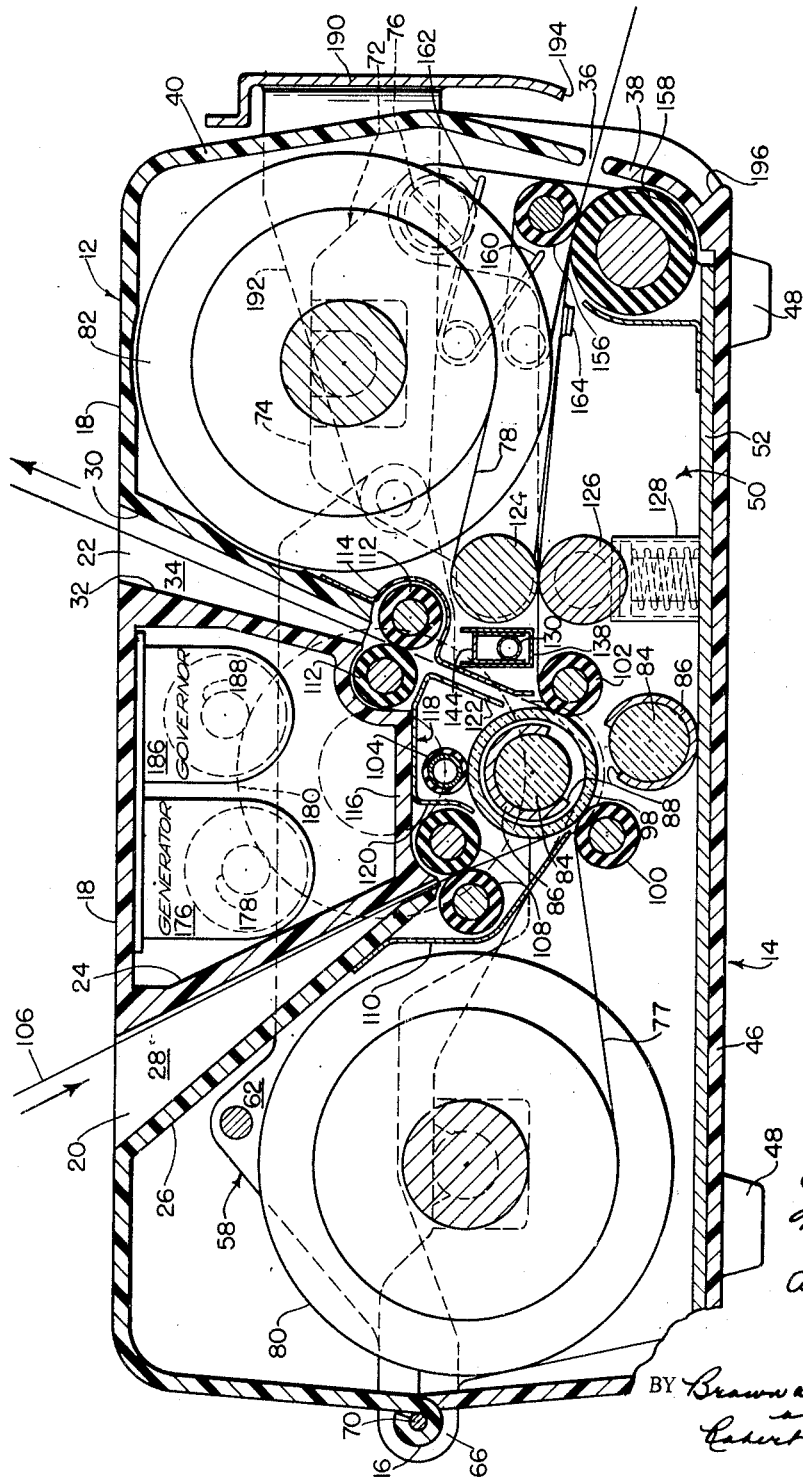
FIG. 3 is a sectional view of the apparatus of FIGS. 1 and 2, the section being taken along a plane substantially midway between the sides of the apparatus.
Figure 7:
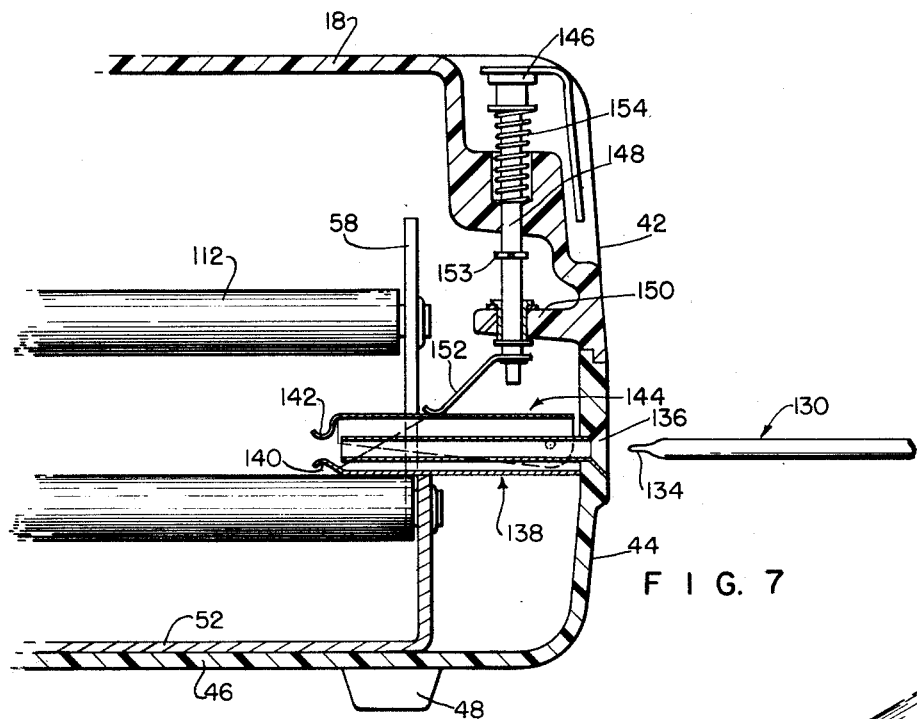
FIG. 7 is a sectional view taken substantially along the line 7—7 of FIG. 1.
Figure 6:
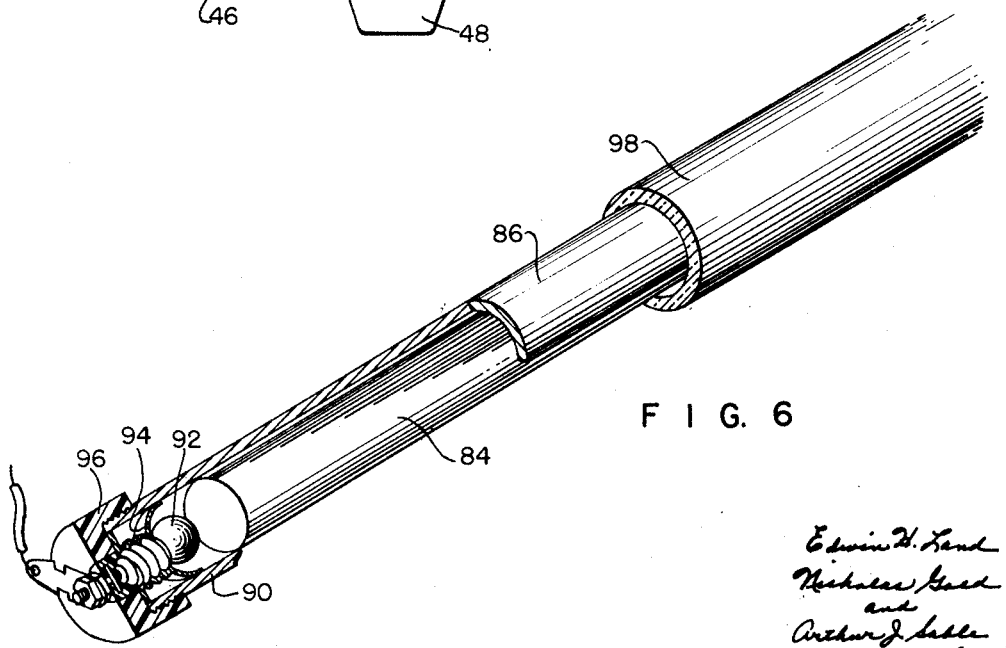
FIG. 6 is a fragmentary perspective view, partially in section, of a light source employed in the document copier.

During exposure of photosensitive sheet 77, an original document, designated 106 in FIG. 3, is superposed with the photosensitive sheet between the latter and tube 98. The original is introduced through passage 20 and means are provided for sealing the passage against the admission of light and guiding and feeding the original into superposition with photosensitive sheet 77 at the bite of guide roll 100 and tube 98. In the form shown, this light-sealing and feeding and guiding means comprise a pair of inlet feed rolls 108 mounted for rotation in juxtaposition with their axes substantially parallel, within housing 10, on and between side plate 60 and 62. Inlet feed rolls 108 include resiliently deformable surfaces and are positioned with the bite of the feed rolls located in alignment with the inner end of passage 20 in position for engaging original 106 and advancing the original toward the bite of tube 98 and guide roll 100. The inlet feed rolls engage the original along a line lying in a plane substantially tangent to the surface of tube 98 at a line at least closely adjacent the line of contact between tube 98 and guide roll 100. At least one of inlet feed rolls 108 is driven for advancing original 106 through passage 20 into the bite of tube 98 and guide roll 100 between the tube and photosensitive sheet 77. A light-sealing element 110 is provided dependent from rear wall 26 and extending downwardly to the rear of the rearmost inlet feed roll 108 and forwardly to a position adjacent the bite of tube 98 and guide roll 100 for insuring against exposure of the photosensitive sheet to light transmitted through passage 20.

As a means for feeding original 106 from the housing through passage 22 following exposure of the photosensitive sheet in superposition with the original, there are provided a pair of outlet feed rolls 112 mounted for rotation in juxtaposition and with their axes parallel on and between side plates 60 and 62. The construction of outlet feed rolls 112 is similar to that of inlet feed rolls 108 and the outlet feed rolls are positioned with the bite of the rolls located at the inner end of exit passage 22 in position for engaging the original along a line lying in a plane substantially tangent to both tube 98 and guide roll 102. The document copying apparatus is designed for copying originals which are substantially flat and tend to assume a planar configuration so that as an original 106 is advanced from between the bite of tube 98 and guide roll 102, the leading edge of the original tends to move in a plane tangent to tube 98, guide roll 102 and outlet feed rolls 112 so as to enter the bite of the outlet feed rolls and become engaged thereby. At least one of the outlet feed rolls is driven for advancing the original from the housing through exit passage 22. Additional light-sealing means are provided for exit passage 22 and, in the form shown, comprise a light-sealing element dependent from forward passage wall 30 extending around the forwardmost outlet feed roll 112 to a position adjacent guide roll 102. Light-sealing element 114 performs the additional function of aiding in guiding the leading end of the original from between tube 98 and guide roll 102 into the bite of outlet feed rolls 112. The housing includes an inner wall 116 extending between forward passage wall 24 and rear passage wall 32. Mounted on inner wall 116 is a light-sealing element 118 having a first dependent portion 120 extending downwardly between the forwardmost inlet feed roll 108 and tube 98 and a second dependent portion 122 extending downwardly from a position adjacent the rearmost outlet feed roll 112 to a position adjacent tube 98. Second dependent portion 122 cooperates with the lower portion of light-sealing element 114 to provide a passage for guiding the original from between tube 98 and guide roll 102 into the bite of outlet feed rolls 112.

As previously noted, the exposed photosensitive sheet 77 is processed to produce a positive copy of the original by superposing the photosensitive sheet with a second or print-receiving sheet 78 and distributing a processing fluid between the superposed sheets to form a sandwich. The means in the apparatus of the invention for performing this processing comprise a pair of pressure-applying rolls 124 and 126, roll 124 being mounted for rotation on intermediate chassis 72 and roll 126 being mounted on lower chassis 50 so that the axis of the rolls lie in substantially a common plane when the apparatus is in the operative position shown in FIG. 3. Rolls 124 and 126 are located adjacent guide roll 102, and roll 126 is mounted for limited movement toward and away from roll 124, spring means 128 being provided for biasing roll 126 toward roll 124. Photosensitive sheet 77 extends from between tube 98 and guide roll 102 between rolls 124 and 126 and image-receiving sheet 78 is conducted from spool 82 around roll 124 into superposition with the photosensitive sheet between rolls 124 and 126. Mounting of spool 82 and pressure-applying roll 124 on intermediate chassis 72 permits the photosensitive and image-receiving sheets to be threaded in superposition between the pressure-applying rolls.

In the form of document copying apparatus shown, the processing fluid for each exposed area of the photosensitive sheet is provided on the photosensitive sheet in the form of an elongated mass extending from side to side of the exposed area of the sheeet near the leading edge of the exposed area, that is, on the portion of the photosensitive sheet extending between guide roll 102 and the bite of pressure-applying rolls 124 and 126. Advancement of the photosensitive and second sheets in superposition between the pressure-applying rolls causes this mass of fluid to be distributed between the sheets toward the trailing end of the exposed area of the photosensitive sheet. It is contemplated that the processing fluid required for each exposed area of the photosensitive sheet, in order to produce a positive copy on the image-receiving sheet, will be supplied in an elongated tubular container very much like a conventional drinking straw. This container, designated 130 in FIG. 9, includes a cavity of substantially uniform cross section approximately equal in length to the width of the exposure area of the photosensitive sheet and filled with the processing fluid. Both ends of the container are sealed to prevent escape of the fluid and the admission of air into the container, and one end, termed the trailing end and designated 132, is constructed so as to become unsealed in response to the generation of hydraulic pressure within the fluid, to form a discharge mouth preferably equal in area to the cross-sectional area of the fluid-filled cavity through which the fluid contents of the container are discharged. Containers of this type, their construction and function are described in detail in the copending application of Edwin H. Land, Serial No. 820,266, filed June 15, 1959.

The apparatus includes means permitting the container to be introduced into the apparatus so that it extends across and adjacent the portion of photosensitive sheet 77 extending between guide roll 102 and the bite of the pressure-applying rolls. This means comprises a tapered opening 136 in lower side wall 44. Mounted within the housing in alignment with opening 136 is a channel-shaped guide member 138 which extends from the tapered opening into the housing past the edge of the photosensitive sheet for supporting and guiding container 130 into the housing into a position extending across and adjacent the photosensitive sheet. The container is introduced into the housing until leading end 134 is located adjacent the margin of the photosensitive sheet furthest from opening 136 and the leading end of the fluid-filled cavity is located adjacent the lateral edge of the exposure area. The container is then compressed at a position in the region of the edge of the exposure area closest opening 136 and simultaneously withdrawn from the apparatus through opening 136. This causes the leading end of the container to become unsealed and the fluid contents of the container to be ejected therefrom in the form of a uniformly distributed elongated mass extending across the portion of the photosensitive sheet extending between guide roll 102 and the pressure-applying rolls.

Means are provided for compressing the container, as described, during its withdrawal in order to cause ejection of the fluid from the container. This means comprises a turned-up curved lip 140 on guide member 138 and a corresponding juxtaposed lip 142 on the end of a channel-shaped pressure member 144 mounted for limited pivotal movement inside guide member 138 in such a way that the guide member and pressure member co-operate to form a tube through which the straw-shaped pod is introduced and withdrawn. A manually operable push button 146 mounted in a recess in upper wall 18 and side wall 42 is provided for pivoting pressure member 144 so that lip 142 is urged toward lip 140 to apply compressive pressure to the container. Push button 146 actuates a plunger rod 148 supported for axial movement in a bracket 150 extending inwardly from upper side wall 42. A spring arm 152 is connected to the inner lower end of plunger rod 148 and bears against pressure member 144 for pivoting the pressure member toward guide member 138 when button 146 and plunger rod 148 are depressed. A split ring 153 is provided on rod 148 as a stop for limiting the downward movement of the rod to prevent undue pressure from being applied to the container. The pressure applied to the container is limited by the resilience of spring arm 152 and this, together with the stop, prevents the container from being compressed so that it might break when withdrawal is attempted. A spring 154 is provided for biasing the push button and plunger arm outwardly.

The photosensitive and print-receiving sheets comprising the sandwich formed by pressure-applying rolls 124 and 126, are required to remain in superposition during a predetermined imbibition (processing) period, during which the sandwich is retained in the dark and at the end of which the sandwich may be moved into the light and the sheets separated. The apparatus includes means for transporting the sandwich through the housing within a lighttight environment and then guiding the sandwich from the housing through withdrawal opening 36. This means comprises a pair of rolls 156 and 158 mounted in juxtaposition within the housing adjacent and in closing relation to withdrawal opening 36. Both of rolls 156 and 158 preferably comprise surface layers of a compliant material having a high coefficient of friction, rubber being desirable for this purpose. Roll 158 is mounted for rotation on lower chassis 50 closely adjacent forward end wall 38. Roll 156 is mounted for rotary movement at its ends on arms 160, in turn pivotally mounted on intermediate chassis 72. Torsion springs 162 are provided for biasing arms 160 so as to urge roll 156 toward and into engagement with roll 158 when the apparatus is in the operative position shown in FIG. 3. Mounting of roll 156 on intermediate chassis 72 permits roll 156 to be spaced apart from roll 158 when the apparatus is in the open position shown in FIG. 4, thereby permitting the photosensitive and second sheets to be threaded between pressure-applying rolls 124 and 126 and between rolls 156 and 158. Tabs 164 are provided on the lower portion of arms 74 of intermediate chassis 72 for engaging arms 160 and acting as a stop for pivotal movement of arms 160 when the intermediate chassis is pivoted to an open position.

The document copying apparatus of the invention is intended, as previously noted, to be manually operated and, in the form shown in FIGS. 1 through 8, is operated by grasping and pulling on a portion of the sandwich comprising the photosensitive and second sheets projecting from the housing through withdrawal passage 36. To operate the apparatus to make a copy, the operator introduces a container 130 into the housing through opening 136, depresses button 146 and holds the button depressed while withdrawing the container from the housing. This provides an elongated mass of fluid on the portion of the photosensitive sheet extending between guide roll 102 and pressure-applying rolls 124 and 126; thereupon the operator introduces an original 106 into passage 20 until the leading end of the original is at the bite of inlet feed rolls 108, whereupon the operator grasps the end portions of the photosensitive and second sheets extending through passage 36 and pulls the photosensitive and image-receiving sheets to advance them through the apparatus. It is during this advancement that the original is fed into superposition with the photosensitive sheet between the latter and tube 98, the photosensitive sheet is exposed and the exposed area of the photosensitive sheet is advanced in superposition with an area of the image-receiving sheet between the pressure-applying rolls to distribute the fluid and form a sandwich which is advanced from the pressure-applying rolls to rolls 156 and 158 and thence from the apparatus through withdrawal passage 36. The apparatus includes a transmission driven by frictional engagement of one of the sheets with one of the rolls and connected with the various components of the apparatus for effecting the introduction and ejection of the original and the exposure of the photosensitive sheet. In the form shown in FIG. 8, the transmission is driven by frictional engagement of the photosensitive sheet with roll 158, and comprises a sequence of engaged torque transmitting members such as toothed or friction gears, the latter being shown as the preferred form because many of the friction gears which are required to coact are on different chassis.

The transmission includes a first friction roll 166 keyed to the shaft on which roll 158 is mounted, and a second (idler) friction roll 168 mounted on side plate 56 of lower chassis 50 in frictional engagement with friction roll 166. Each of outlet feed rolls 112 is connected to a friction roll 170, the latter being frictionally engaged with one another and one of friction rolls 170 being frictionally engaged with second friction roll 168, the latter transmitting torque to friction roll 170 with which it is engaged for rotating the output feed rolls. Torque is transmitted to the inlet feed rolls 108 through an idler friction roll 172 engaged with one of friction rolls 170 and with one of a second pair of friction rolls 174 coupled with inlet feed rolls 108. Only one of outlet feed rolls 112 need be driven to feed the original from the apparatus when the leading edge of the original has been fed from the bite of tube 98 and guide roll 102 into the bite of the outlet feed rolls. The other friction roll 170 would then merely function as an idler for transmitting torque from the driving friction roll 170 to idler friction roll 172.

As previously noted, the document copying apparatus of the invention is designed to be operated manually without the need for an outside source of electrical power; and power for the light sources, i.e., lamps 92, is supplied manually in conjunction with advancement and processing of the sheet materials. Current for the lamps is supplied by a direct or alternating current generator, designated 176, connected to the transmission through a friction drive roll 178 and an idler friction roll 180 keyed to the same shaft as idler friction roll 172. Generator 176 is shown as being mounted on upper wall 18 of the upper housing section intermediate inlet and exit passages 20 and 22. Reference is now made to FIG. 10 of the drawings for a circuit diagram showing the electrical connections between the generator and lamps 92 and one system for determining which of the two lamps is to be employed for exposure and the intensity of the lamp. One output terminal of the generator is grounded in the chassis and the other output terminal is connected to a rheostat 182 having separate parallel windings each connected in series with one of lamps 92. The construction of the rheostat is such that only one of the windings is employed at any time so that only one of the lamps is illuminated. A control knob 184 is provided on the rheostat exterior of the housing so that the lamps may be employed selectively and the intensity thereof may be controlled.

The exposure of the photosensitive sheet and the duration of the processing of the photosensitive and image-receiving sheets is a function of the rate of advancement of the sheets through the apparatus and accordingly, the rate of movement of the sheets through the apparatus must be controlled. For this purpose the apparatus is provided with a governor designated 186. Governor 186 may be of a conventional mechanical type mounted, for example, coaxially with generator 176 on the same shaft or, as in the form shown, may be mounted apart from a generator and connected to the transmission through a friction drive roll 188 frictionally engaged with idler friction roll 180. The governor functions to limit the speed of the transmission and thereby control the output of the generator and, hence, intensity of lamps 92; and also controls the rate at which the photosensitive sheet is moved through the apparatus so that the period during which any portion of the photosensitive sheet is subjected to exposure to light from bars 84 is substantially predetermined and constant. The rate of movement of the sandwich comprising the exposed photosensitive sheet and the image-receiving sheet from pressure-applying rolls 124 and 126 to rolls 156 and 158 is also controlled so that the processing or imbibition period is of a predetermined constant duration.

When making a copy of a document, the portion of the sandwich projecting from the apparatus through 36 is pulled until a predetermined length of the two sheets is advanced through the apparatus. This length is approximately equal to the length of the document being copied plus sufficient extra sheet material to advance the portion of the sandwich containing the copy completely from the apparatus through opening 36. A metering mechanism may be provided in the apparatus and coupled with the transmission for metering the length of the sheets advanced through the apparatus for each copy, or the sheet materials may be provided with some indicia visible to the operator to indicate when a sufficient length of the sheet materials has been withdrawn through the apparatus. The aforementioned extra length of sandwich is obviously at least equal to the sheet path length between guide roll 102 and opening 36 and this extra length of sandwich may, in one form of the apparatus, serve to trap and retain any excess processing fluid which is distributed between the sheets beyond the trailing edges of the exposed area of the photosensitive sheet and image-receiving area of the second sheet.

When a length of sandwich containing a copy of an original has been advanced from the apparatus through withdrawal opening 36, this length of sandwich is then severed in the region of the withdrawal opening from the portion of the sandwich remaining within the apparatus. Severance of the sandwich is accomplished with the aid of a cutter bar 190 mounted on arms 192 which are pivotally mounted on upper chassis 58. Arms 192 extended through slots in forward end wall 40 and cutter bar 190 is located exterior of the forward end wall and is pivotable from a position with its lower edge, designated 194, disposed adjacent and just above opening 36 to a second position with edge 194 disposed below opening 36 and abutting a shoulder 196 at the juncture of forward end wall 38 and bottom wall 46. Pivoting cutter bar 190 downward (in a clockwise direction viewing FIG. 3) causes a short section of the sandwich to be retained between the cutter bar and end wall 38, and this section of the sandwich functions as a leader which may be grasped after the sandwich has been severed therefrom by tearing the sandwich against edge 194 of the cutter bar which, incidentally, may be sharpened to facilitate this operation. A torsion spring (not shown) may be provided for urging the cutter bar counterclockwise (viewing FIG. 3) into the upper position shown in the drawings, at which position the operator may grasp the section of the sandwich extending through opening 36 for pulling the sheets through the apparatus to produce a copy of an original document.

Figure 11:
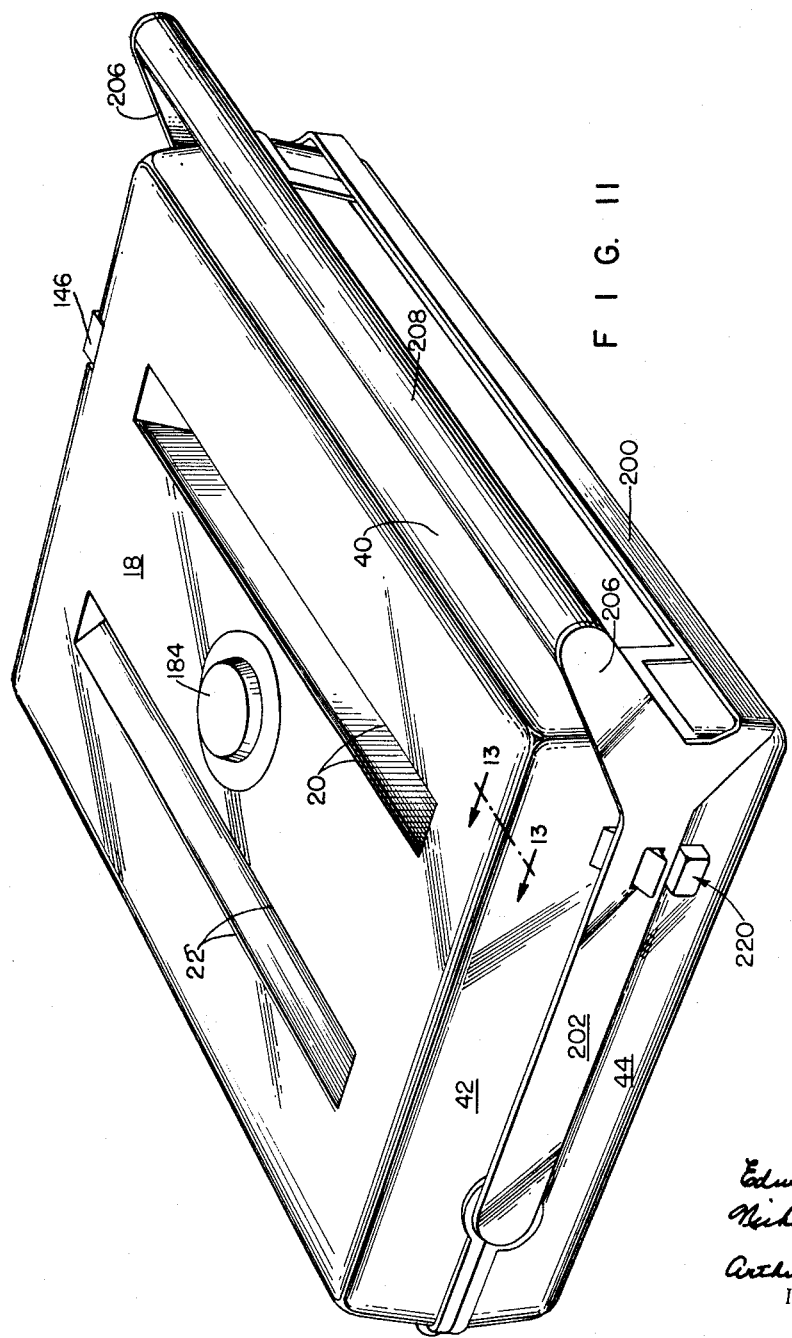
FIG. 11 is a perspective view showing another embodiment of document copying apparatus incorporating the invention.
Figures 12, 13:
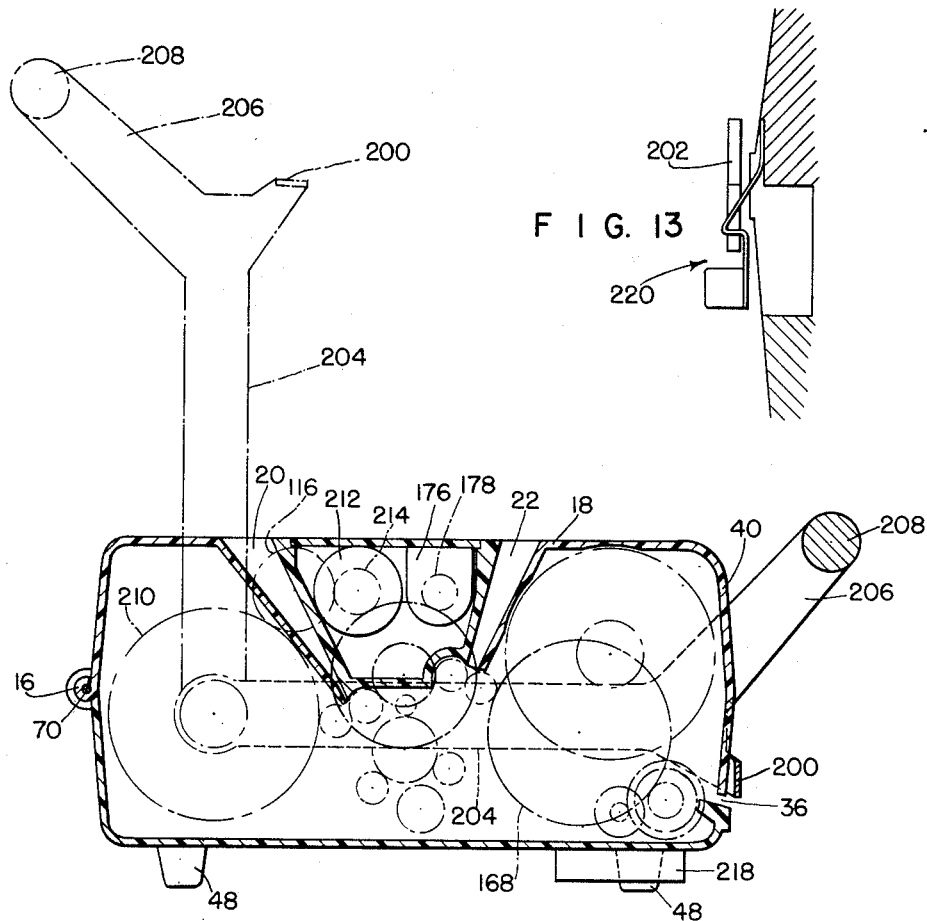
FIG. 12 is a somewhat schematic sectional view of the document copying apparatus of claim 11.
FIG. 13 is a sectional view taken substantially along the line 13—13 of FIG. 11, showing in detail components of the apparatus.

The power input to the document copier of the invention is entirely manual and, instead of being applied directly to the photosensitive and second sheets by grasping the sheets, the input of power to the apparatus may be accomplished by the winding or tensioning of a conventional spring motor which would then serve to drive the transmission for advancing the photosensitive and image-receiving sheets through the apparatus, for feeding an original into and from the apparatus, and for operating the generator to supply current to the lamps. Another embodiment of the document copying apparatus, incorporating a spring motor for driving the apparatus, is illustrated in FIGS. 11 through 13 of the drawings. The overall construction and arrangement of the various components of the document copier of FIGS. 11 through 13 is substantially the same as that previously described and shown, the differences residing primarily in the transmission and the cutter bar. The torque required for winding or tensioning the spring motor is transmitted to the spring motor by way of the cutter bar, which is required to be manually actuated prior to the production of a copy.

The document copying apparatus of FIGS. 11 and 12 comprises a cutter bar, designated 200, mounted on a pair of arms 202 and 204 located exterior of the housing of the apparatus and pivotally mounted near the "rear" end of the apparatus. Arms 202 and 204 are provided with extensions 206 on which is mounted a handle 208, which may be employed for actuating the cutter bar. The transmission includes a friction drive roll 210 coupled with one of arms 202 and 204 so as to be rotated by the arm. A conventional spring motor 212 is provided mounted within the housing on upper wall 18 and is coupled with friction drive roll 210 through a friction drive roll 214 engaged with an idler friction roll 216 in turn engaged with friction drive roll 210. The governor, in this embodiment, is designated 218 and is located on the under side of the housing adjacent the forward end of the housing and is connected to the transmission through a suitable gear arrangement which is not shown. The remaining components of the transmission are substantially the same as those previously described including friction drive rolls for transmitting torque from the drive motor to the inlet and outlet feed rolls, and roll 158 which, in this embodiment, functions to advance the sandwich through the apparatus.

Cutter bar 200, and the arms on which it is mounted, are movable between three positions, the first being the position shown in FIG. 11 in which the lower edge of cutter bar 200 is located just above and adjacent withdrawal opening 36, permitting the sandwich to be advanced by rolls 156 and 158 through opening 36 from the housing. The cutter bar can be depressed slightly to a second position in order to clamp a portion of the sandwich projecting through the opening, and provides means against which the sandwich may be drawn for severing it from the remainder of the sandwich remaining in the housing. The cutter bar is preferably biased in a counterclockwise direction to a third position, shown in FIG. 12, in which arms 202 and 204 extend vertically. The cutter bar is moved into this third position and then returned to the first-mentioned position for tensioning the spring motor. A detent type of latch 220 is provided on the housing for releasably engaging arm 202 and retaining the cutter bar in the first-mentioned position, shown in FIG. 11. The latch detent is engaged in an opening in arm 202 and is constructed to permit limited movement of the cutter bar from the first to the second position thereof to facilitate severance of the sandwich projecting through opening 36.

To employ the document copying apparatus of FIGS. 11 through 13, the operator releases latch 220 and grasps handle 208 and pivots the handle and cutter bar to the third position shown in FIG. 12, and then pivots the handle and cutter bar in a clockwise direction winding the spring motor. A suitable release mechanism is provided in the transmission for preventing the spring motor from driving the device until it is desired to make a copy. Such a release mechanism may include a manually operated device or a device which is actuated to release the drive when an original is introduced into inner passage 20 into the bite of the inlet rolls. When the drive mechanism is released, the spring motor advances the sheets through the apparatus while simultaneously driving the generator to power one of the lamps and drive the inlet and outlet rolls to advance the original into superposition with the photosensitive sheet and, following exposure thereof, advance the original from the housing. In this embodiment as well, means may be provided for metering the length of the sheets advanced and arresting the sheet advancement when the desired length of the sheets has been advanced, or the spring motor may be so constructed and coupled with the transmission as to advance the sheets through the apparatus the distance required for making a single copy. While other mechanisms may be provided for tensioning the spring motor, the use of the cutter bar for this purpose is preferred, since the cutter bar, when employed in this manner, performs a dual function.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Manually operated photographic document copying apparatus comprising, in combination, an electrically operated source of actinic light for exposing a photosensitive image-recording sheet during movement of said photosensitive sheet through said apparatus relative to said source of illumination; said apparatus being constructed to permit a manual driving force to be imparted to said photosensitive sheet for moving said photosensitive sheet through said apparatus relative to said source during exposure of said sheet; an electrical generator electrically coupled with said source for supplying power thereto for operating said source; and means engaged with said sheet for movement thereby coupled with said generator for transmitting said manual driving force from said sheet to said generator to operate the latter for producing power to operate said source during and in response to movement of said sheet relative to said source.

2. The photographic apparatus of claim 1 wherein speed-governing means are provided operatively coupled with said means for transmitting said driving force from said photosensitive sheet to said generator for controlling the rate of movement of said sheet through said apparatus and for controlling the output of said generator.

3. Manually operated photographic document copying apparatus comprising, in combination, an electric lamp providing a source of illumination for exposing a photosensitive image-recording sheet during movement of said photosensitive sheet through said apparatus relative to said source of illumination; processing means for progressively distributing a processing fluid in contact with said area of photosensitive sheet during said movement of said photosensitive sheet through said apparatus; said apparatus being constructed for imparting a manual driving force to said photosensitive sheet for moving said photosensitive sheet through said apparatus relative to said source and distributing said processing fluid; an electrical generator electrically coupled with said lamp for supplying power thereto; and means engaged with said sheet and coupled with said generator for transmitting said manual driving force to said generator to operate the latter for producing power to illuminate said lamp during and in response to manual movement of said photosensitive sheet through said apparatus relative to said lamp.

4. Manually operated photographic document copying apparatus comprising, in combination, a housing for mounting and enclosing the components of said apparatus; an electric lamp providing a source of illumination for exposing a photosensitive image-recording sheet during movement of said photosensitive sheet through said apparatus relative to said source; means defining an opening in said housing through which said photosensitive sheet is withdrawn from said housing and through which portions of said photosensitive sheet extend sufficiently to permit said portions to be engaged manually for applying a manual driving force to said sheet for moving said sheet through and from said apparatus; an electrical generator electrically connected with said lamp for supplying power thereto; and transmission means coupled with said generator and including means engaged with said photosensitive sheet for movement thereby for transmitting said manual driving force from said sheet to said generator to operate the latter for producing current during and in response to manual movement of said photosensitive sheet through said apparatus.

5. The photographic apparatus of claim 4 wherein speed-governing means are provided operatively coupled with said transmission means for controlling the rate of movement of said sheet through said apparatus relative to said source and controlling the output of said generator.

6. Manually operated document copying apparatus comprising, in combination, a housing for mounting and enclosing components of said apparatus; an electric lamp providing a source of illumination for exposing a photosensitive image-recording sheet; guide means for holding an original document to be copied in contact with an area of said photosensitive sheet and guiding said original and photosensitive sheet in position for exposure to light from said source of illumination during and in response to movement of said sheet and said original through said apparatus relative to said source of illumination; processing means for superposing said area of said photosensitve sheet with an area of a second sheet and distributing a processing fluid between said sheets during and in response to movement of said photosensitive sheet through said apparatus relative to said source; means defining an opening in said housing through which one of said sheets is moved from said housing and through which portions of said one sheet extend sufficiently to permit said portions to be engaged manually for applying a manual withdrawal force to said one sheet for moving said photosensitive sheet through said apparatus relative to said source and into superposition with said second sheet; an electrical generator electrically coupled with said lamp for supplying power thereto; transmission means operatively coupled with said generator and including means engaged with said photosensitive sheet for movement thereby for transmitting said manual force to said generator to operate the latter for producing current to illuminate said lamp during and in response to movement of said photosensitive superposition with said second sheet and during distribution of said fluid between said sheets.

7. The photographic apparatus of claim 6 wherein speed-governing means are provided operatively coupled with said transmission means for controlling the rate of movement of said photosensitive sheet through said apparatus and controlling the output of said generator.

8. Photographic document-copying apparatus comprising, in combination, a housing for mounting and enclosing components of said apparatus; guide means for holding an original document to be copied in contact with an area of said photosensitive sheet and guiding said original and photosensitive sheet in position for exposure to light from said source of illumination during advancement of said sheet and said original through said apparatus relative to said source of illumination; processing means for superposing said area of said photosenstive sheet with an area of a second sheet and distributing a processing liquid between said sheets during advancement of said photosensitive sheet through said apparatus; means defining an opening in said housing through which one of said sheets is moved from said housing and through which portions of said one sheet extend so that said portions can be engaged for applying manual force to said one sheet for advancing said photosensitive sheet through said apparatus; an electrical generator electrically coupled with said lamp for supplying power thereto; drive means including a member mounted in frictional engagement with said photosensitive sheet for movement in response to advancement of said photosensitive sheet through said apparatus operatively coupled with said generator for transmitting said manual force to said generator to operate the latter for producing current to illuminate said lamp during movement of said photosensitive sheet through said apparatus.

9. The photographic apparatus of claim 6 wherein said guide means include means operatively coupled with said transmission means for moving said original into superposition with said photosensitive sheet, separating said original from said photosensitive sheet following exposure thereof and feeding said original from said apparatus following separation of said original from said photosensitive sheet.

10. Photographic document copying apparatus comprising, in combination, a housing for mounting and enclosing the components of said apparatus; an electric lamp providing a source of illumination for exposing a photosensitive sheet during advancement of said photosensitive sheet through said apparatus relative to said source; means defining an opening in said housng through which said photosensitive sheet is advanced from said housing and through which portions of said photosensitive sheet extend so that said portions can be engaged for applying a manual driving force to said sheet for advancing said sheet through said apparatus; a pair of juxtaposed light sealing members including a roll mounted within said housing in closing relation to said openng for engaging said photosensitive sheet during advancement of said sheet between said members through said opening and preventing the admission of light through said opening; an electrical generator electrically coupled with said lamp for supplying power thereto; said roll being rotatable by and in response to engagement with said sheet during movement thereof; and transmission means coupled with said generator and with said roll for transmitting said driving force from said sheet to said generator to operate the latter for producing current during advancement of said photosensitive sheet through said apparatus.

11. Photographic document copying apparatus comprising, in combination, a housing for mounting and enclosing the components of said apparatus; an electrical generator providing a source of illumination for exposing a photosensitive sheet during advancement of said photosensitive sheet through said apparatus relative to said source; processing means including at least one pressure-applying roll for engaging said photosensitive sheet following exposure thereof and distributing a processing fluid in contact with said photosensitive sheet during advancement of said sheet through said apparatus; means defining an opening in said housing through which said photosensitive sheet is advanced from said housing and through which portions of said photosensitive sheet extend so that said portions can be manually engaged for applying a driving force to said sheet for advancing said sheet through said apparatus; an electrical generator electrically connected with said lamp for supplying power thereto; and transmission means coupled with said generator and said pressure-applying roll for transmitting said driving force from said photosensitive sheet to said generator to operate the latter for producing current during advancement of said photosensitive sheet through said apparatus.

12. Photographic document copying apparatus comprising, in combination, a housing for mounting and enclosing the components of said apparatus; an electric lamp providing a source of illumination for exposing a photosensitive sheet during advancement of said photosensitive sheet through said apparatus relative to said source; an electrical generator coupled with said lamp; sheet engaging means; a spring motor coupled with said sheet-engaging means for imparting a driving force to said photosensitive sheet for advancing said photosensitive sheet through said apparatus and coupled with said generator for operating the latter to generate current during advancement of said photosensitive sheet through said apparatus; and manually engageable means coupled with said spring motor for tensioning said spring motor.

13. The photographic apparatus of claim 12 wherein speed-governing means are provided operatively coupled with said spring motor for controlling the rate of advancement of said sheet through said apparatus and controlling the output of said generator.

14. The photographic apparatus of claim 12 wherein said manually engageable means comprise means for severing portions of said photosensitive sheet projecting from said housing through said opening from other portions of said sheet remaining within said housing.

15. Photographic document copying apparatus comprising, in combination, an electric lamp providing a source of illumination for exposing a photosensitive sheet during advancement of said photosensitive sheet through said apparatus relative to said source; processing means for superposing exposed areas of said photosensitive sheet with areas of a second sheet and distributing a processing fluid in contact with said superposed sheets during advancement of said photosensitive sheet through said apparatus; an electrical generator electrically connected with said lamp for supplying power thereto; a spring motor coupled with sheet-engaging means for advancing said photosensitive sheet through said apparatus and coupled with said generator for operating said generator to produce current during advancement of said photosensitive sheet through said apparatus; means for advancing portions of at least one of said sheets from said apparatus during advancement of said photosensitive sheet through said apparatus, and manually engageable means for severing said portions of said one sheet from other portions of said one sheet remaining within said apparatus, the last-named means being operatively coupled with said spring motor for tensioning said motor.

16. The photographic apparatus of claim 15 wherein speed-governing means are provided operatively coupled with said spring motor and said generator for controlling the rate of advancement of said photosensitive sheet through said apparatus and controlling the output of said generator.

References Cited in the file of this patent

UNITED STATES PATENTS

| | | |
|---|---|---|
| 1,400,819 | Higgins | Dec. 20, 1921 |
| 2,653,527 | Land | Sept. 29, 1953 |
| 2,692,540 | Bing et al. | Oct. 26, 1954 |
| 2,732,778 | Limberger | Jan. 31, 1956 |

UNITED STATES PATENT OFFICE
CERTIFICATE OF CORRECTION

Patent No. 3,152,531　　　　　　　　　　　　　October 13, 1964

Edwin H. Land et al.

It is hereby certified that error appears in the above numbered patent requiring correction and that the said Letters Patent should read as corrected below.

Column 1, line 36, after "feeding" insert -- it --; line 61, for "wil" read -- will --; column 2, line 7, for "material" read -- materials --; column 3, line 33, for "uppjer" read -- upper --; line 59, for "preferably" read -- preferable --; column 5, lines 44 and 45, for "intermediat" read -- intermediate --; line 45, for "plate" read -- plates --; column 10, line 19, after "through" insert -- opening --; column 11, line 23, for "couplied" read -- coupled --; column 13, lines 49 and 50, for "photosensitive superposition" read -- photosensitive sheet through said apparatus relative to said source into superposition --.

(SEAL)　　　　　Signed and sealed this 15th day of June 1965.

Attest:

ERNEST W. SWIDER
Attesting Officer

EDWARD J. BRENNER
Commissioner of Patents